(12) United States Patent
Kuramoto et al.

(10) Patent No.: US 10,391,859 B2
(45) Date of Patent: Aug. 27, 2019

(54) WORK VEHICLE

(71) Applicant: Kubota Corporation, Osaka-shi (JP)

(72) Inventors: Takashi Kuramoto, Sakai (JP); Hiroki Bessho, Sakai (JP); Kantaro Morimoto, Sakai (JP); Sechan Park, Sakai (JP); Rei Tokuda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/980,534

(22) Filed: May 15, 2018

(65) Prior Publication Data

US 2019/0009668 A1    Jan. 10, 2019

(30) Foreign Application Priority Data

Jul. 5, 2017  (JP) .................. 2017-132065
Mar. 6, 2018  (JP) .................. 2018-039514

(51) Int. Cl.
| | | |
|---|---|---|
| *B60K 13/02* | (2006.01) | |
| *B60K 11/06* | (2006.01) | |
| *B60K 5/00* | (2006.01) | |
| *B62D 25/10* | (2006.01) | |

(52) U.S. Cl.
CPC ............... *B60K 13/02* (2013.01); *B60K 5/00* (2013.01); *B60K 11/06* (2013.01); *B62D 25/105* (2013.01); *B60K 2005/003* (2013.01); *B60Y 2200/124* (2013.01)

(58) Field of Classification Search
CPC .... B60K 13/02; B60K 5/00; B60K 2005/003; B60K 2005/006; B60K 11/06; B62D 25/105; B62D 25/10; B62D 25/12; B60Y 2200/124
USPC ...................... 180/68.1, 68.2, 68.3
See application file for complete search history.

(56) References Cited

U.S. PATENT DOCUMENTS

| | | | |
|---|---|---|---|
| 5,086,858 A | 2/1992 | Mizuta et al. | |
| 7,690,472 B2* | 4/2010 | Kato | B60K 17/34 180/291 |
| 8,316,975 B2* | 11/2012 | Azuma | B60K 13/02 180/291 |
| 8,434,580 B2* | 5/2013 | Azuma | F02M 35/162 180/291 |
| 8,453,775 B2* | 6/2013 | Belzile | B60K 11/02 180/291 |
| 10,099,547 B2* | 10/2018 | Bessho | B60K 5/04 |

* cited by examiner

*Primary Examiner* — John D Walters
(74) *Attorney, Agent, or Firm* — The Webb Law Firm

(57) ABSTRACT

A work vehicle includes a blower pipe extending between an inner space of a front hood and a rear portion of a vehicle body for sucking cooling air from the inner space toward an engine section. The blower pipe has an air inlet that is opened toward an inner side in a vehicle body transverse direction in the inner space.

6 Claims, 6 Drawing Sheets

WORK VEHICLE

CROSS-REFERENCE TO RELATED APPLICATIONS

This application claims priority to Japanese Patent Applications No. 2017-132065, filed Jul. 5, 2017 and No. 2018-039514, filed Mar.6, 2018, the disclosures of which are hereby incorporated in their entirety by reference.

BACKGROUND OF THE INVENTION

1. Field of the Invention The present invention is directed to a work vehicle.

2. Description of the Related Art

U.S. Pat. No. 5,086,858 discloses a utility vehicle (a multi-purpose vehicle) for an example of a work vehicle. In the work vehicle, an air inlet is provided at an upper end portion of a hollow vertical frame; and a lower end portion of the vertical frame and a cooling air inlet of a belt speed changer device are interconnected via a duct, so that cooling air is introduced via the vertical frame to the belt speed changer device.

However, in case cooling air is supplied to an engine section, since air in the atmosphere is sucked at a portion located at a high position of the vehicle body. Therefore, the higher is the traveling speed of the vehicle body, the higher is the velocity of the introduced air, so that suction efficiency is deteriorated and efficient feeding of cooling air to the engine section becomes difficult.

Then, there is a need for a work vehicle that is capable of feeding cooling air to an engine section in an efficient manner irrespectively of change in traveling speed of a vehicle body, and that is also capable of suppressing occurrence of inconvenience due to vehicle washing water or the like.

SUMMARY OF THE INVENTION

In view of the above, there is proposed a work vehicle as follows.

A work vehicle comprising:

a vehicle body;

a front hood provided at a front portion of the vehicle body and forming an inner space under a closed state;

an engine section provided at a rear portion of the vehicle body; and a blower pipe extending between the inner space and the rear portion of the vehicle body for sucking cooling air from the inner space toward the engine section, the blower pipe having an air inlet that is opened toward an inner side in a vehicle body transverse direction in the inner space.

With this arrangement, since the arrangement introduces air present inside the front hood whose velocity does not increase as much as air in the atmosphere when the traveling speed of the vehicle body becomes high, the air can be introduced in an efficient manner, irrespectively of change occurring in the traveling speed of the vehicle body.

Even if vehicle washing water sprayed in the inside of the front hood is scattered from its spraying position to its periphery, the possibility of this water falling into the transversely oriented air inlet is low. Moreover, even if bugs or the like introduced together with the air flowing to the inside of the front hood in the course of traveling may lose some of its velocity inside the front hood, the possibility of such bugs or the like dropping into the transversely oriented air inlet is low also.

Therefore, cooling air can be supplied to the engine section in an efficient manner, irrespectively of change occurring in the traveling speed of the vehicle body. Moreover, it is readily possible to prevent vehicle washing water or bugs or the like from entering the blower pipe to cause corrosion or clogging of this pipe.

According to one preferred embodiment, the blower pipe includes: a blower pipe body having a leading end which is opened upwardly of the vehicle body in the inner space, and an attachment detachably attached to the leading end of the blower pipe body, the attachment having the air inlet.

With the above arrangement, at a normal time, when the attachment is attached, there is obtained a state in which the blower pipe is provided with the air inlet oriented toward the transverse inner side of the vehicle body. Thus, as described above, cooling air can be supplied to the engine section in an efficient manner irrespectively of change occurring in the traveling speed, while avoiding the adverse influence to the blower pipe from vehicle washing water, bugs, or the like.

At the time of maintenance of the blower pipe, the attachment which is the portion forming the air inlet can be detached from the blower pipe body, so that this attachment can be handled conveniently. With detachment of the attachment, the leading end of the blower pipe body is opened upwards, so that a cleaning tool or the like can be easily inserted into the blower pipe body from above. In this way, maintenance operation such as cleaning operation can be carried out conveniently.

According to one preferred embodiment, the work vehicle further comprises: a spring coupled to the blower pipe body and to the attachment, the spring retaining the attachment by pulling under the coupled state of the attachment to the blower pipe body.

With this arrangement, with such simple coupling retaining arrangement consisting of provision of a spring only, and with a simple operation of activating this spring, the attachment can be maintained under the state of being coupled to the blower pipe body in a reliable manner.

According to one preferred embodiment, the work vehicle further comprises a driving section provided forwardly of the engine section with respect to the vehicle body; wherein:

the vehicle body includes a vehicle framework;

the vehicle framework includes a driving section pipe frame that extends through a lower portion of the driving section in a vehicle body front-rear direction; and the blower pipe comprises the driving section pipe frame.

With this arrangement, since the sturdy driving section pipe frame is utilized as the blower pipe, in comparison with a case of employing a dedicated blower pipe, it is possible to obtain simple work vehicle configuration and to obtain a sturdy blower pipe arrangement inexpensively.

Further and other features and advantages obtained thereby will become apparent upon reading the following description.

BRIEF DESCRIPTION OF THE DRAWINGS

FIGS. 1 through 7 show one embodiment of a work vehicle, in which: FIG. 1 is a left side view showing a utility vehicle (a multi-purpose vehicle) in its entirety as one example of work vehicle, FIG. 2 is a plan view showing the utility vehicle in its entirety, FIG. 3 is a left side view showing a cooling arrangement of a stepless speed changer device, FIG. 4 is a rear view showing an air inlet portion of a blower pipe, FIG. 5 is a plan view in horizontal section showing the air inlet portion of the blower pipe, FIG. 6 is a front view in vertical section showing the air inlet portion of the blower pipe, and FIG. 7 is a perspective view showing an attachment and a front portion of a blower pipe body.

DETAILED DESCRIPTION OF PREFERRED EMBODIMENTS

[General Configuration of Utility Vehicle]

In the following description, with respect to a vehicle body 1 of a utility vehicle (an example of "work vehicle"), a direction of an arrow "F" shown in FIG. 1, FIG. 2, etc., is defined as "vehicle body front side", a direction of an arrow "B" is defined as "vehicle body rear side, a direction of an arrow "R" is defined as "vehicle body right side", and a direction of an arrow "L" is defined as "vehicle body left side", respectively.

Figure 1:
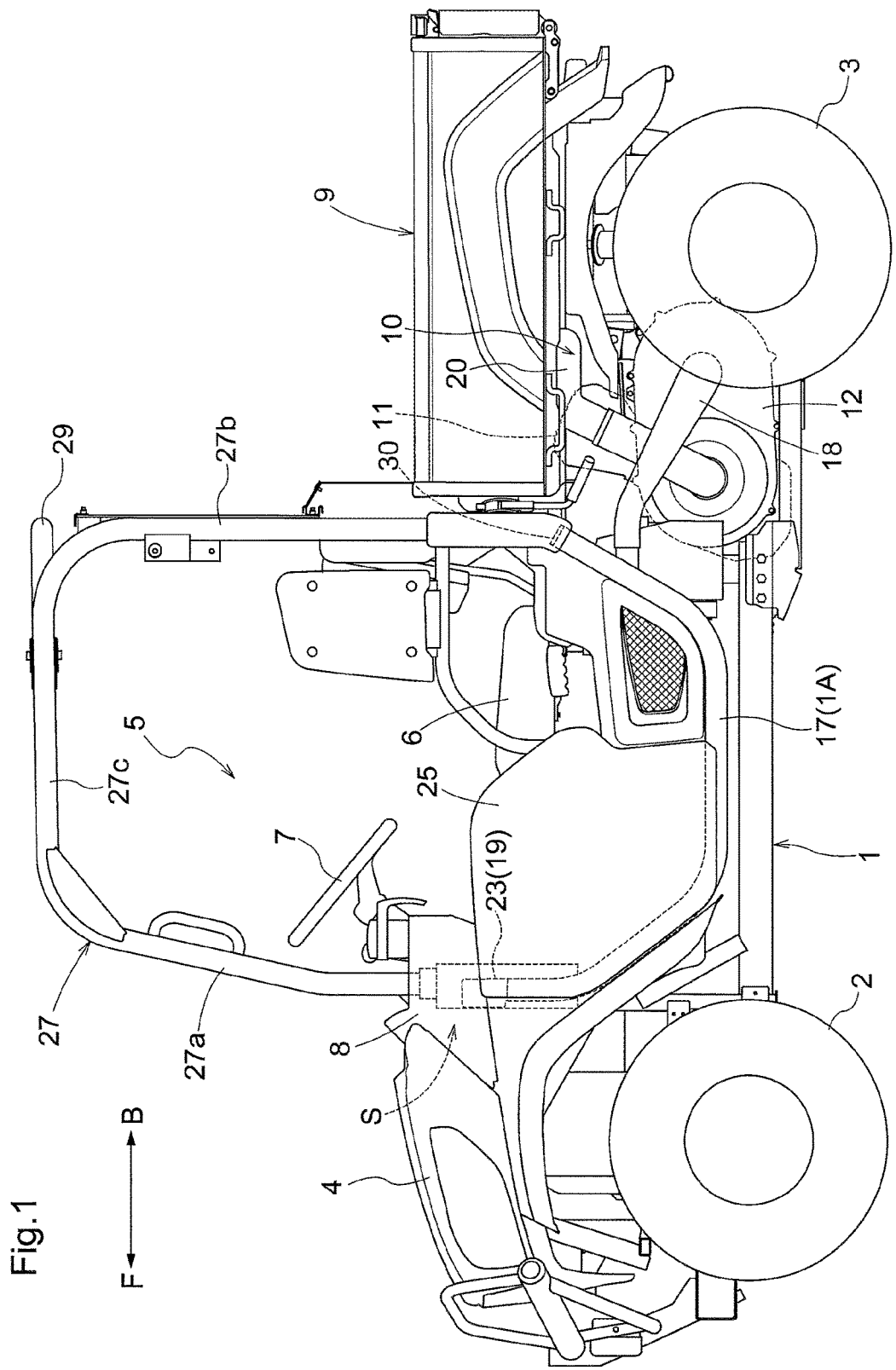
Figure 2:
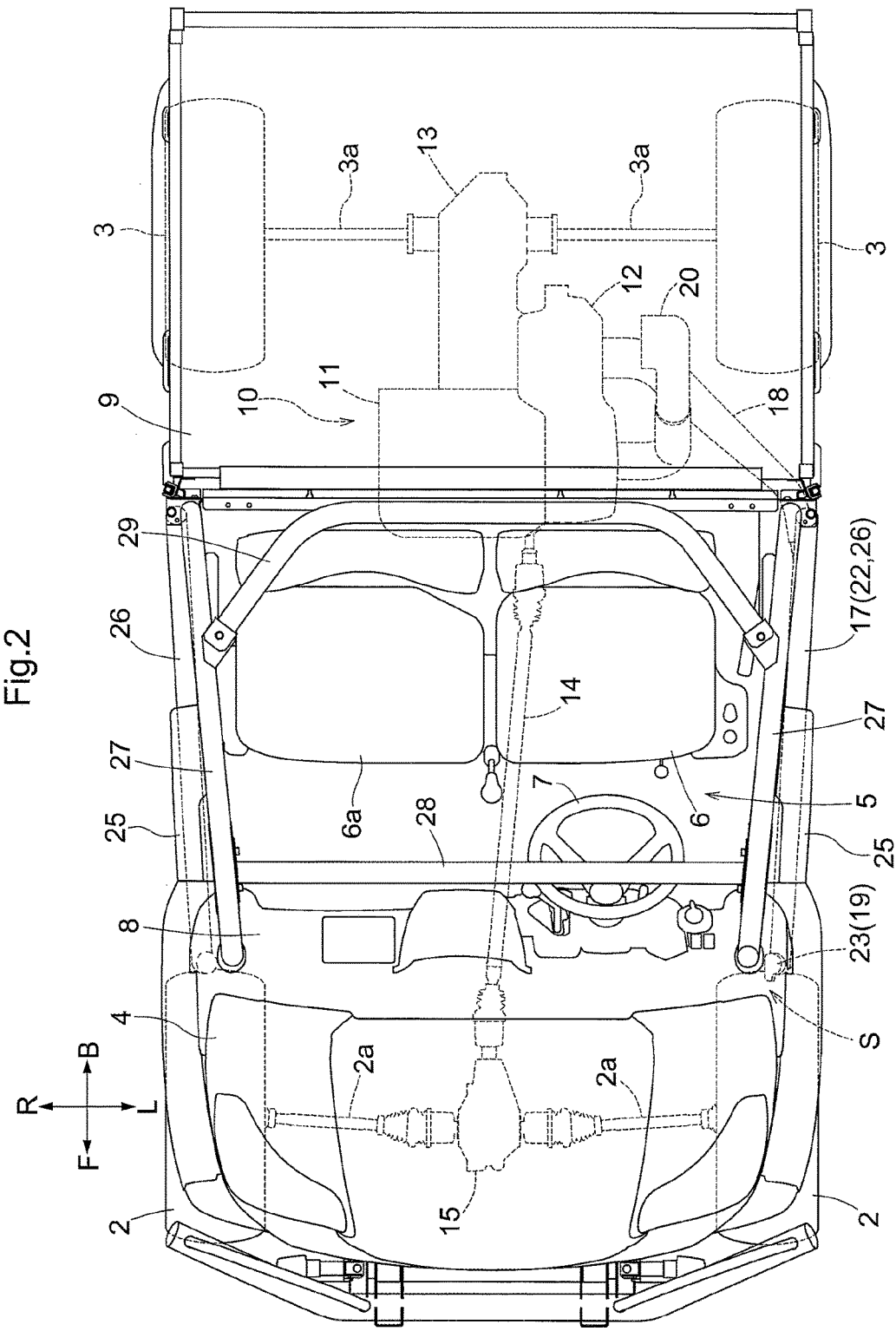

As shown in FIG. 1 and FIG. 2, the utility vehicle includes the vehicle body 1 having a vehicle framework 1A comprised of a combination assembly of pipe frame members, etc.; a pair of right and left front wheels 2 each mounted at a front portion of the vehicle body 1 to be steerable and drivable; and a pair of right and left rear wheels 3 each mounted at a rear portion of the vehicle body 1 to be drivable. At a front portion of the vehicle body 1, there is provided a front hood 4 (front lid) which covers the upper side of a front portion of the vehicle framework 1A, etc. and forms an inner space S under a closed state thereof. At rear portions of the vehicle body 1, there are provided a driving section 5 and an engine section 10. The driving section 5 is disposed forwardly of the engine section 10 between the front wheels 2 and the rear wheels 3. The driving section 5 includes a driver's seat 6, an auxiliary seat 6a (passenger seat), a steering wheel 7 for steering the front wheels 2, and a front cover 8 provided as a dashboard. A load carrying deck 9 is provided upwardly of the engine section 10 at a rear portion of the vehicle body 1.

[Arrangement of Engine Section 10]

As shown in FIG. 1 and FIG. 2, the engine section 10 includes an engine 11, a belt type stepless speed changer device 12 and a traveling transmission 13. In the engine section 10, power of the engine 11 is inputted to the stepless speed changer device 12 and converted therein into power with its rotational speed steplessly changed, and the resultant output from the stepless speed changer device 12 is inputted to the traveling transmission 13 to be outputted therefrom to the rear wheels 3 and the front wheels 2. Front-wheel driving power outputted from the traveling transmission 13 is transmitted via a rotational shaft 14 to a front wheel differential mechanism 15, and from the front wheel differential mechanism 15 to the right and left front wheels 2 via front wheel drive shafts 2a. Rear-wheel driving power outputted from the traveling transmission 13 is transmitted via rear wheel drive shafts 3a to the right and left rear wheels 3.

[Cooling of Stepless Speed Changer Device 12]

Figure 3:
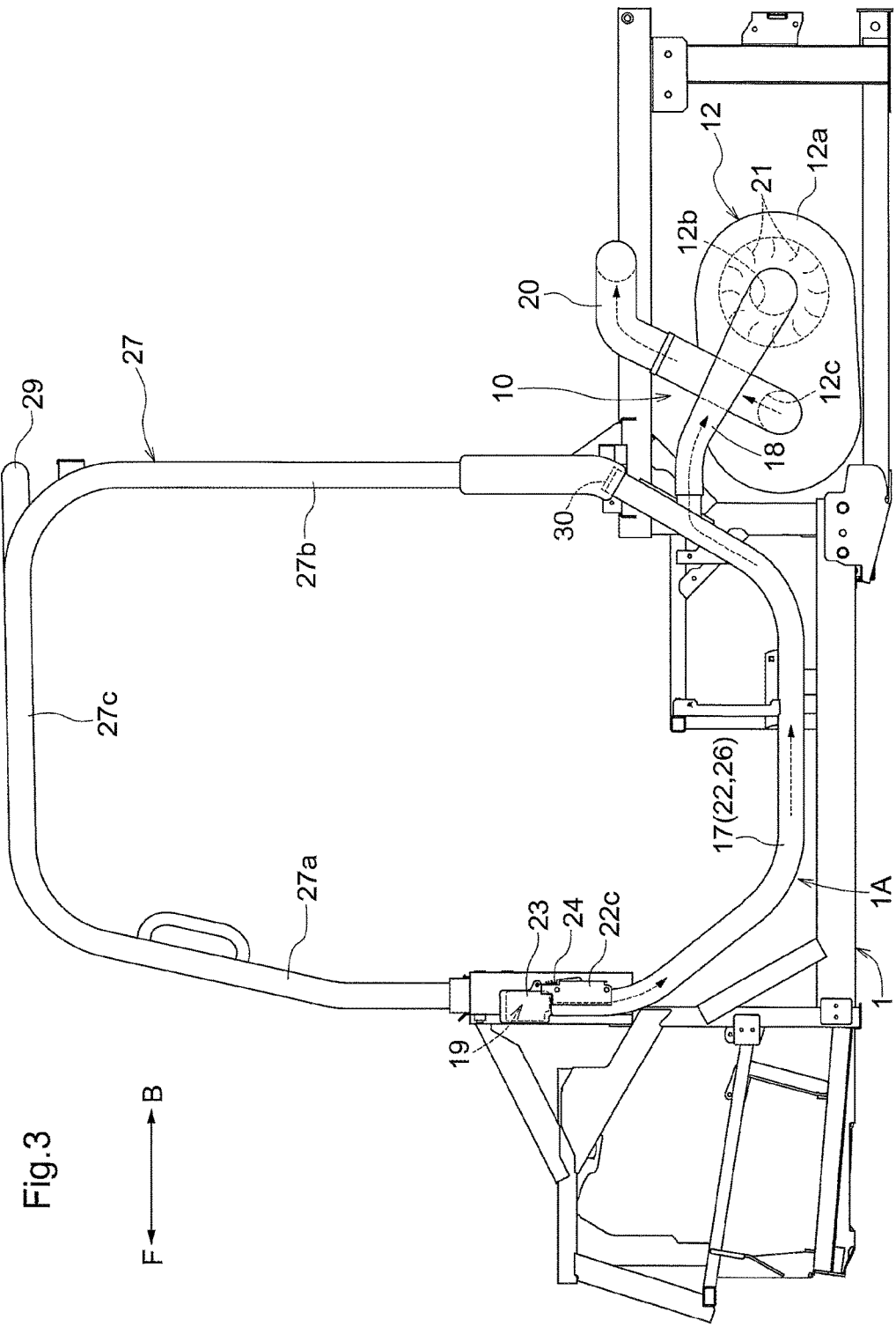
Figure 4:
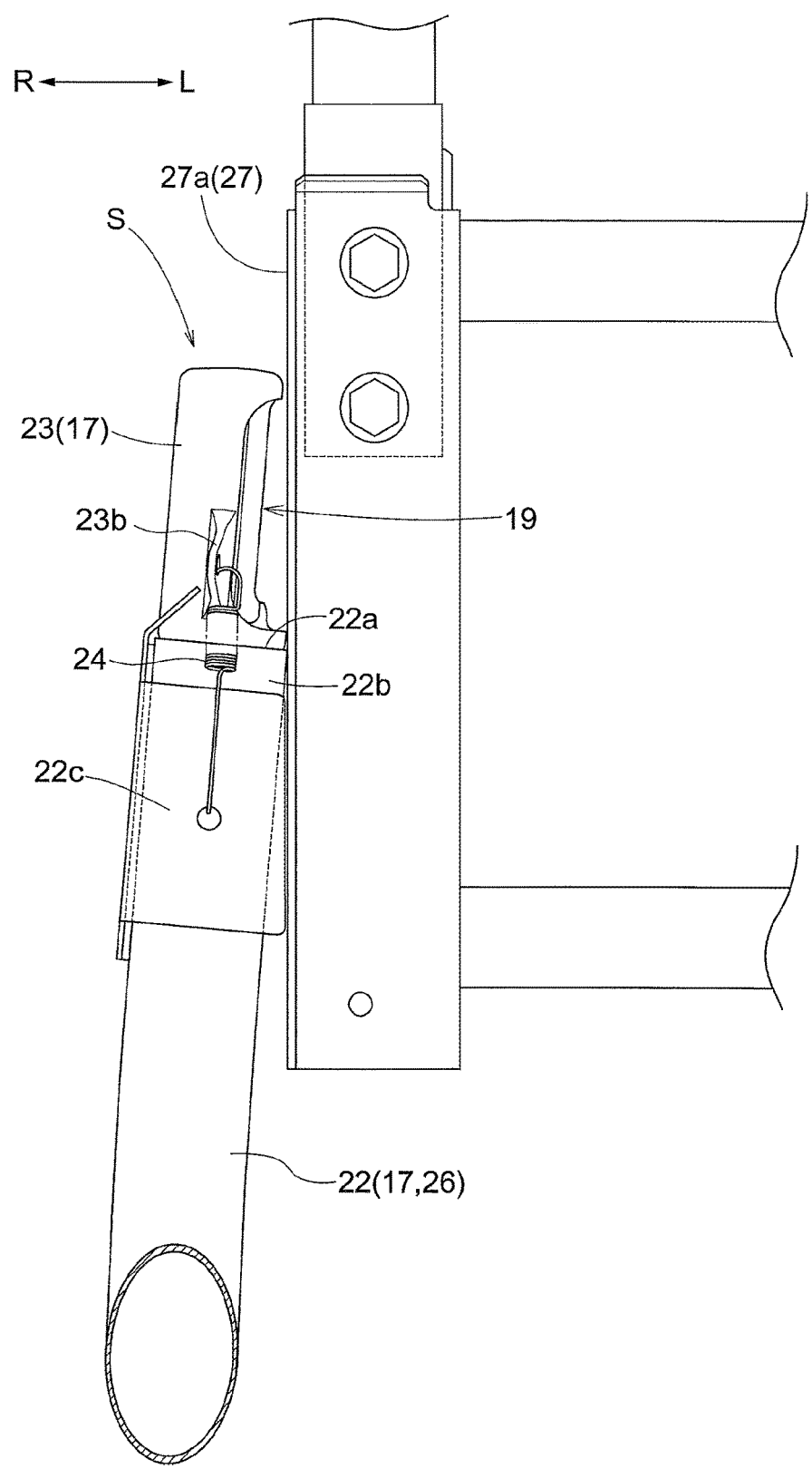
Figure 5:
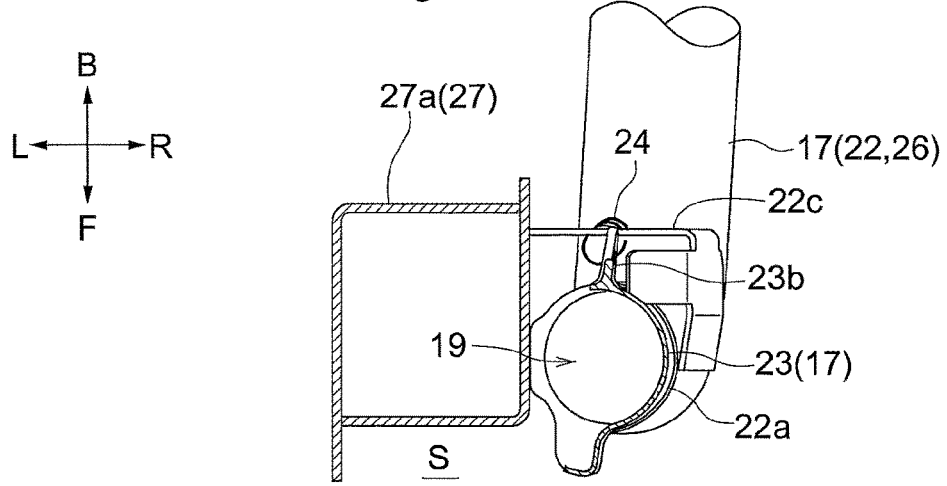
Figure 6:
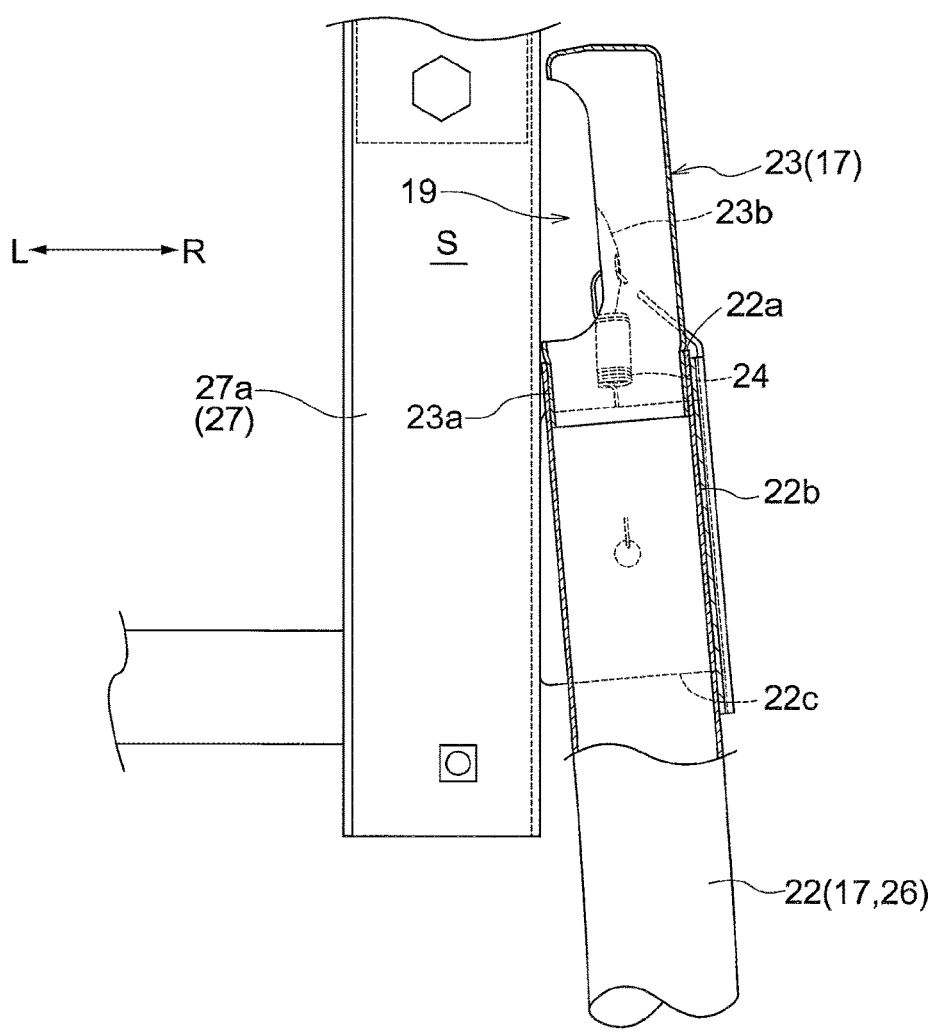

As shown in FIG. 1, FIG. 2 and FIG. 3, downwardly of a transverse (lateral) portion of the driver's seat 5, there is provided a blower pipe 17 extending in the vehicle body front-rear direction. The blower pipe 17 is provided between a space that extends between the lower side of the front hood 4 and the lower side of a front cover 8 of the driving section 5, namely, the blower pipe 17 extends between the inner space S of the front hood 4 and a rear portion of the vehicle body 1. As shown in FIGS. 4, 5 and 6, at a front portion of the blower pipe 17, there is formed an air inlet 19 which is opened into the inner space S. The air inlet 19 is opened to the inner side in the vehicle body transverse direction. The air inlet 19 is opened toward an upper driving section frame 27. The upper driving section frame 27 acts as a "guard member" for the air inlet 19. As shown in FIGS. 1, 2 and 3, a rear portion of the blower pipe 17 and a cooling air introducing portion 12b of the stepless speed changer device 12 are communicated to each other via a connection pipe 18. An exhaust pipe 20 extends from a cooling air exhaust portion 12c of the stepless speed changer device 12. The stepless speed changer device 12 has a speed changer case 12a; and the cooling air introducing portion 12b is provided at one end side portion in a belt pulley juxtaposing direction, i.e. in a lateral portion of a speed changer case 12a. The cooling air exhaust portion 12c is provided at the other end side portion in the belt pulley juxtaposing direction, i.e. in the lateral portion of the speed changer case 12a. A rotary blade 21 (see FIG. 3) is non-rotatably mounted on a belt pulley constituting the stepless speed changer device 12. Specifically, in the illustrated embodiment, the rotary blade 21 is mounted on an output-side belt pulley.

Under the suction force generated in association with air feeding by the rotary blade 21, air present in the inner space S is sucked into the blower pipe 17 through the air inlet 19, and the sucked air is fed, as cooling air, to the inside of the speed changer case 12a via the blower pipe 17 and the connection pipe 18 through the cooling air introducing portion 12b. The supplied cooling air flows inside the speed changer case 12a from one end side to the other end side, so that the stepless speed changer device 12 is cooled by this flowing cooling air. Cooling air after cooling the stepless speed changer device 12 flows out of the inside of the speed changer case 12a through the cooling air exhaust portion 12c into the exhaust pipe 20, so that via this exhaust pipe 20, the air is discharged to the outside of the engine section 10.

As shown in FIGS. 3, 4, 5 and 6, the inside of the speed changer case 12a includes a blower pipe body 22 constituting a portion of the blower pipe 17 located on more downstream side than the air inlet 19, and an attachment device 23 (simply referred to as "attachment 23" hereinafter) constituting a portion of the blower pipe 17 having the air inlet 19.

As shown in FIGS. 4, 5 and 6, a leading end 22a of the blower pipe body 22 is located in the inner space S of the front hood 4 and is opened upwardly of the vehicle body.

Figure 7:
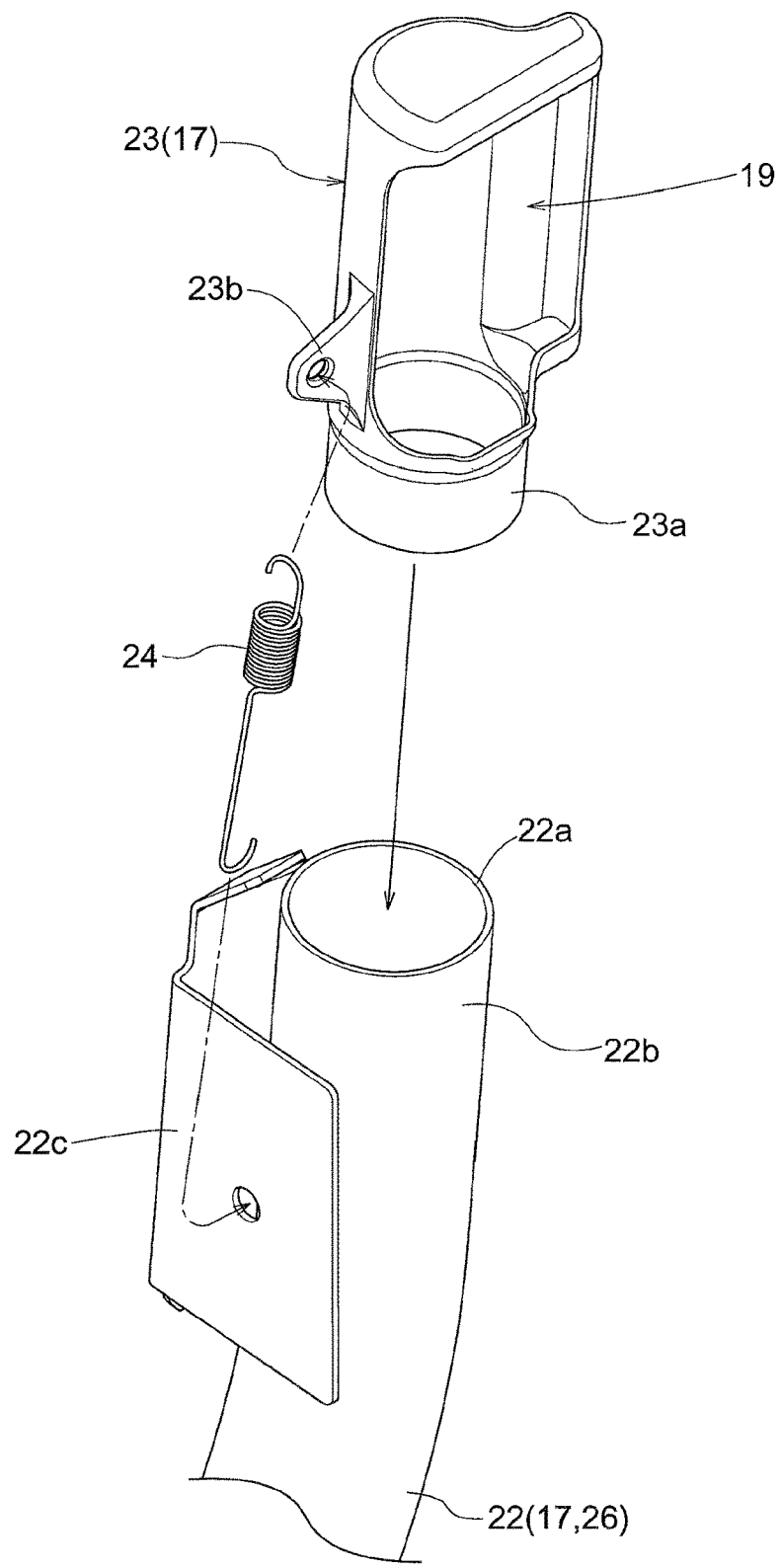

As shown in FIG. 7, the attachment 23 includes a connection portion 23a which is formed downwardly of the air inlet 19. As shown in FIGS. 4, 5 and 6, when the connection portion 23a of the attachment 23 is engaged within the leading end portion 22b of the blower pipe body 22 from above, the attachment 23 is placed under a state detachably attached to the blower pipe body 22 to be communicated with the blower pipe body 22. When the attachment 23 is connected to the blower pipe body 22, a spring 24 is connected to/between a spring hook portion 23b of the attachment 23 and a spring hook portion 22c of the blower pipe body 22, and the spring 24 retains the attachment 23 by pulling under the coupled state of the attachment 23 to the blower pipe body 22. The spring hook portion 22c of the blower pipe body 22 is formed by a portion of a member which forms a supporting portion of a driving section door 25 (see FIG. 1) in the blower pipe body 22.

Under a normal state, the air inlet 19 is formed in the blower pipe 17 by engaging the attachment 23. The air inlet 19 is formed in such a manner that the inlet 19 is opened to the lateral inner side with respect to the vehicle body in the inner space S of the front hood 4, and that the upper driving section frame 27 becomes a guard member for the air inlet 19. Thus, the air inside the inner space S is sucked into the blower pipe 17 and fed, as cooling air, via the bower pipe 17 and the connection pipe 18 to the stepless speed changer device 12, with effective prevention of possibility of vehicle washing water scattered from the spraying portion inside the front hood 4, as well as bugs or the like entering the inside of the front hood 4, from dropping into the air inlet 19.

At the time of maintenance of the blower pipe 17, the attachment 23 will be removed. Whereby, it becomes possible to handle the attachment 23, which is the portion having the air inlet 19 of the blower pipe 17, separately from and independently of the blower pipe body 22. Then, as the leading end 22a of the blower pipe body 22 is opened upwards, a cleaning tool or the like can be easily inserted into the blower pipe body 22, so that maintenance operation such as cleaning operation can be carried out conveniently.

[Blower Pipe 17]

As shown in FIGS. 1, 2 and 3, the vehicle framework 1A includes lower driving section pipe frames 26 (corresponding to "driving section pipe frame" as an element of the present invention) provided downwardly of opposed transverse side portions of the driving section 5; and the upper driving section frames 27 provided upwardly of the opposed transverse ends of the driving section 5. Front portions of the right and left upper driving section frames 27 are connected to each other by a front connection fame 28. Further, rear portions of the right and left upper driving section frames 27 are connected to each other by a rear connection fame 29.

As shown in FIGS. 1, 2 and 3, each of the right and left upper driving section frames 27 includes a front vertical frame portion 27a extending along the vehicle body vertical direction at a front portion of the transverse side of the driving section 5; a rear vertical frame portion 27b extending along the vehicle body vertical direction at a rear portion of the transverse side of the driving section 5; and an upper front-rear frame portion 27c interconnecting an upper portion of the front vertical frame portion 27a and an upper portion of the rear vertical frame portion 27b.

As shown in FIG. 1, each of the right and left lower driving section pipe frames 26 extends through a lower portion of the transverse side of the driving section 5 and extends in the vehicle body front-rear direction. Each of the right and left lower driving section pipe frames 26 is provided and extends between the inner space S of the front hood 4 and the rear portion of the driving section 5 as a rear portion of the vehicle body 1. The front end portion of the lower driving section pipe frame 26 and a lower portion of the front vertical frame portion 27a in the upper driving section frame 27 are disposed side by side in the vehicle body transverse width direction, with the front end portion of the lower driving section pipe frame 26 being disposed on more vehicle body transverse outer side than the lower portion of the front vertical frame portion 27a. An opening at the rear end of the left lower diving section pipe frame 26 is closed by a lid member 30 (see FIG. 1).

The blower pipe 17 is constituted of the left lower driving section pipe frame 26. More particularly, the blower pipe body 22 of the blower pipe 17 is constituted of the left lower driving section pipe frame 26.

[Further Embodiments]

(1) In the foregoing embodiment, there was disclosed an exemplary arrangement in which the stepless speed changer 12 is employed as a subject of cooling to which cooling air is fed via the blower pipe 17, but the invention is not limited thereto. Any other device such as the engine which is provided in the engine section 10 can also be used as the cooling subject.

(2) In the foregoing embodiment, there was disclosed an exemplary arrangement in which the blower pipe 17 includes the attachment 23 and the blower pipe body 22. The invention is not limited thereto. For instance, it is also possible to employ a blower pipe which does not have the attachment 23 and whose blower pipe portion having the air inlet 19 is detachable.

(3) In the foregoing embodiment, there was disclosed an exemplary arrangement including the spring 24, but the invention is not limited thereto and various coupling arrangements are possible. For instance, a flange may be provided in each of the attachment 23 and the blower pipe body 22, so that the flanges of the attachment 23 and the blower pipe body 22 are coupled to each other via a fastening tool such as a coupling bolt.

(4) In the foregoing embodiment, there was disclosed an exemplary arrangement in which the blower pipe 17 is constituted of the lower driving section pipe frame 26, but the invention is not limited thereto. A separate and dedicated blower pipe may be employed instead.

(5) In the foregoing embodiment, the work vehicle is a utility vehicle, but the invention is not limited thereto. The work vehicle may be any other work vehicle such as a transport vehicle, a tractor, a combine, etc.

What is claimed is:

1. A work vehicle comprising:
a vehicle body;
a front hood provided at a front portion of the vehicle body and forming an inner space under a closed state;
an engine section provided at a rear portion of the vehicle body;
a blower pipe extending between the inner space and the rear portion of the vehicle body for sucking cooling air from the inner space toward the engine section, the blower pipe including an air inlet that is opened toward an inner side in a vehicle body transverse direction in the inner space, a blower pipe body having a leading end which is opened upwardly of the vehicle body in the inner space, and an attachment detachably attached to the leading end of the blower pipe body, the attachment having the air inlet; and
a spring coupled to the blower pipe body and to the attachment, the spring retaining the attachment by pulling under the coupled state of the attachment to the blower pipe body.

2. A work vehicle, comprising:
a vehicle body;
a front hood provided at a front portion of the vehicle body and forming an inner space under a closed state;
an engine section provided at a rear portion of the vehicle body;
a driving section provided forwardly of the engine section with respect to the vehicle body; and
a blower pipe extending between the inner space and the rear portion of the vehicle body for sucking cooling air from the inner space toward the engine section, the blower pipe having an air inlet that is opened toward an inner side in a vehicle body transverse direction in the inner space,
wherein:
the vehicle body includes a vehicle framework;

the vehicle framework includes a driving section pipe frame that extends through a lower portion of the driving section in a vehicle body front-rear direction; and the blower pipe comprises the driving section pipe frame.

3. A work vehicle comprising:

a vehicle body;

a front hood provided at a front portion of the vehicle body and forming an inner space under a closed state;

an engine section provided at a rear portion of the vehicle body;

a driving section provided forwardly of the engine section with respect to the vehicle body; and a blower pipe extending between the inner space and the rear portion of the vehicle body for sucking cooling air from the inner space toward the engine section, the blower pipe having an air inlet that is opened toward an inner side in a vehicle body transverse direction in the inner space, wherein the driving section includes a front vertical frame portion extending along a vehicle body vertical direction at a front portion of a lateral side of the driving section, and wherein the air inlet is configured to be opened toward the front vertical frame portion.

4. The work vehicle as defined in claim 3, wherein the blower pipe includes:

a blower pipe body having a leading end which is opened upwardly of the vehicle body in the inner space, and an attachment detachably attached to the leading end of the blower pipe body, the attachment having the air inlet.

5. The work vehicle as defined in claim 4, further comprising:

a spring coupled to the blower pipe body and to the attachment, the spring retaining the attachment by pulling under the coupled state of the attachment to the blower pipe body.

6. The work vehicle as defined in claim 3, wherein:

the vehicle body includes a vehicle framework;

the vehicle framework includes a driving section pipe frame that extends through a lower portion of the driving section in a vehicle body front-rear direction; and the blower pipe comprises the driving section pipe frame.

* * * * *